April 18, 1933.  W. L. HAWK  1,904,765
MEANS FOR TORQUE CONTROL AND AUTOMATIC DRILL CONTROL
Filed Nov. 28, 1930  3 Sheets-Sheet 1

INVENTOR.
Watson L. Hawk.

INVENTOR
Watson L. Hawk

Fig. 5.

INVENTOR
Watson L. Hawk

Patented Apr. 18, 1933

1,904,765

UNITED STATES PATENT OFFICE

WATSON L. HAWK, OF LONG BEACH, CALIFORNIA

MEANS FOR TORQUE CONTROL AND AUTOMATIC DRILL CONTROL

Application filed November 28, 1930. Serial No. 498,557.

This present invention is an improvement upon that device shown and described in an application heretofore filed by me under date of December 28, 1929, Serial No. 417,108, for combined weighing device and automatic drill control.

My invention relates to apparatus for controlling or limiting the application of torque in the transmission of power from a power element to a follower or driven element, whereby damage or breakage through the application of an excessive amount of power or torque is minimized or eliminated and consists essentially in the insertion in the power line, between the prime mover and the driven device, of a mechanism so constructed and arranged that when the resistance to torque in the driven mechanism exceeds a predetermined point, usually the safe working load of the same, the connection between the prime mover and the driven mechanism is automatically released or disconnected and remains so until the adverse condition has been corrected when the connection will be again automatically established.

While I have shown and will describe my invention as being applied to the mechanism used in drilling oil wells, it will be obvious that it is equally applicable to any other form of power transmission mechanism in which a driver and follower is used. It is also obvious that the principles of this invention may be made an integral part of the power transmission mechanism instead of being separate units as I have outlined.

I have shown how it may be used advantageously in connection with automatic control of well drilling apparatus such as was shown in an application filed by me under date of December 28, 1929 Serial No. 417,108 and entitled Combined weighing device and automatic drill control.

As is well known in the oil well drilling industry a large amount of damage and considerable expense is frequently caused by the drill stem breaking or twisting off by reason of the fact that too much pressure is applied to the drill or an obstruction is encountered thereby and it is the object of my invention to provide mechanism to be inserted in the power line between the rotary table and its driving element and adjusted to release or disconnect the rotary table from its driving element when the resistance of the rotary table or drill stem to rotation exceeds the safe working load for which machine was adjusted.

Another object is to provide a mechanism of the above character which can be positioned in the power line with but slight or no alteration of the same and which will be simple in operation and construction and of a maximum efficiency.

A still further object is to provide mechanism of the above character which can be easily and quickly adjusted to maintain any desired torque upon the drill stem or driven mechanism.

Other objects and advantages will appear hereinafter and, while I have shown and will describe the preferred form of my invention, it will be understood that various changes and adaptations may be made therein without departing from the spirit of my invention.

In the drawings accompanying and forming a part hereof.

Referring to the drawings, 10 (Fig. 2) is a shaft the ends of which are mounted for rotation in bearings 11 and 12 which are fastened to the base plate 13. Rigidly mounted on shaft 10 is a sprocket 14. Loosely mounted on shaft 10 is the sleeve 15 on the outer end of which is fixed a sprocket 16 and on the inner end thereof the spur gear 17. Rotatably mounted around sleeve 15 and around shaft 10 is the housing 18 which contains the countershaft 19 rotatably mounted in bearings 20 and 21. On shaft 19 is positioned the step gear 22 which consists of two spur gears of differing diameters. On shaft 10 is rigidly mounted the spur gear 23, the teeth of which mesh with the teeth of the cone gear 22 which in turn meshes with the teeth of gear 17. As the gears of 22 differ in diameter in like manner the diameters of gears 17 and 23 also differ.

Figure 1:
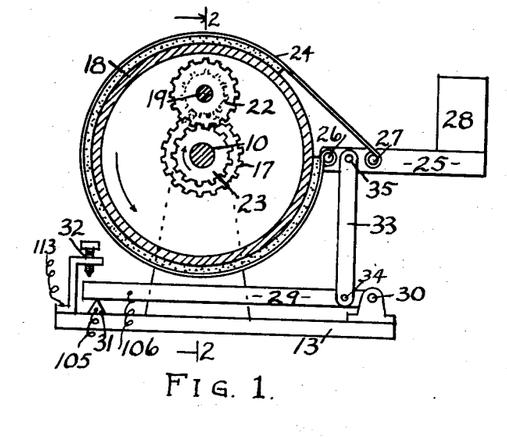
Fig. 1 is a side elevation of the torque control device with cover plate removed.
Figure 2:
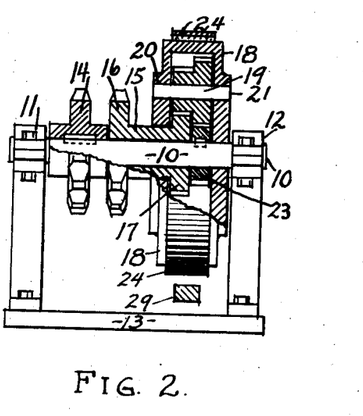
Fig. 2 is a side elevation of Fig. 1 showing part in section along line 2—2 in Fig. 1.

The outer periphery of housing 18 is turned smooth and around this housing is placed the brake band 24 which may be lined with a friction lining. The ends of band 24 are pivoted to beam 25 by pins 26 and 27 spaced a distance apart. On the outer end of beam 25 is placed a weight 28. Above the base plate 13 is placed a beam 29 one end of which is pivoted in bearing 30 which is secured to base 13. The outer end of beam 29 is positioned between a lower electric contact 31 and an upper electric contact 32 which is positioned so that beam 29 may contact with either 31 or 32 but not both at the same time. Beams 29 and 25 are connected together and spaced apart by the link 33 and pins 34 and 35. Pin 35 at the upper end of link 33 is placed between pins 26 and 27 and acts as a fulcrum to beam 25 for the force of weight 28 acting downward at end thereof. Said force continues downward through link 33 to beam 29 causing it to come to rest against the contact point 31 which is the normal working position. Further action of weight 28 causes the band 24 to become taut and press against the housing 18 offering friction against the rotation of said housing around shaft 10. Said friction will be in proportion to the amount of weight 28.

Power from an external source applied to sprocket 14 causes shaft 10 to rotate and with it the gear 23. This causes gear 22 to revolve around shaft 19 in as much as the housing 18 is held from turning by the friction from band 24. Rotation of gear 22 causes gear 17, sleeve 15 and sprocket 16 to revolve around shaft 10. Sprocket 16 is connected by a suitable chain to the driven mechanism.

The transmission of power from sprocket 14 to sprocket 16 through the train of gears of differing diameters causes a tendency for the housing 18 to rotate in an opposite direction from that of sprockets 14 and 16. For normal working conditions this will be in the direction as shown by arrow in Fig. 1. The tendency to rotate housing 18 is in proportion to the resistance to rotation or load applied to sprocket 16. This tendency to rotate is also communicated by friction to band 24 which tends to lift the weight 28 and the beam 29.

When the drill bit is stuck or the power required to rotate sprocket 16 causes the rotating tendency of housing 18 to become greater than the resistance offered by weight 28, then the housing 18 does start to rotate and the friction between it and band 24 lifts the beam 25, weight 28, link 33, and beam 29 against the upper contact 32 which limits the upward motion of beam 29 and link 33. Further rotation of band 24 further lifts weight 28 thereby loosening band 24 upon housing 18 and the friction is lessened until housing 18 slides under band 24 and continues to do so until the bit frees itself or until the load upon sprocket 16 becomes less than the resistance offered by weight 28. Changing the amount of weight 28 changes proportionately the amount of applied torque necessary to cause the housing 18 to rotate.

Figure 5:
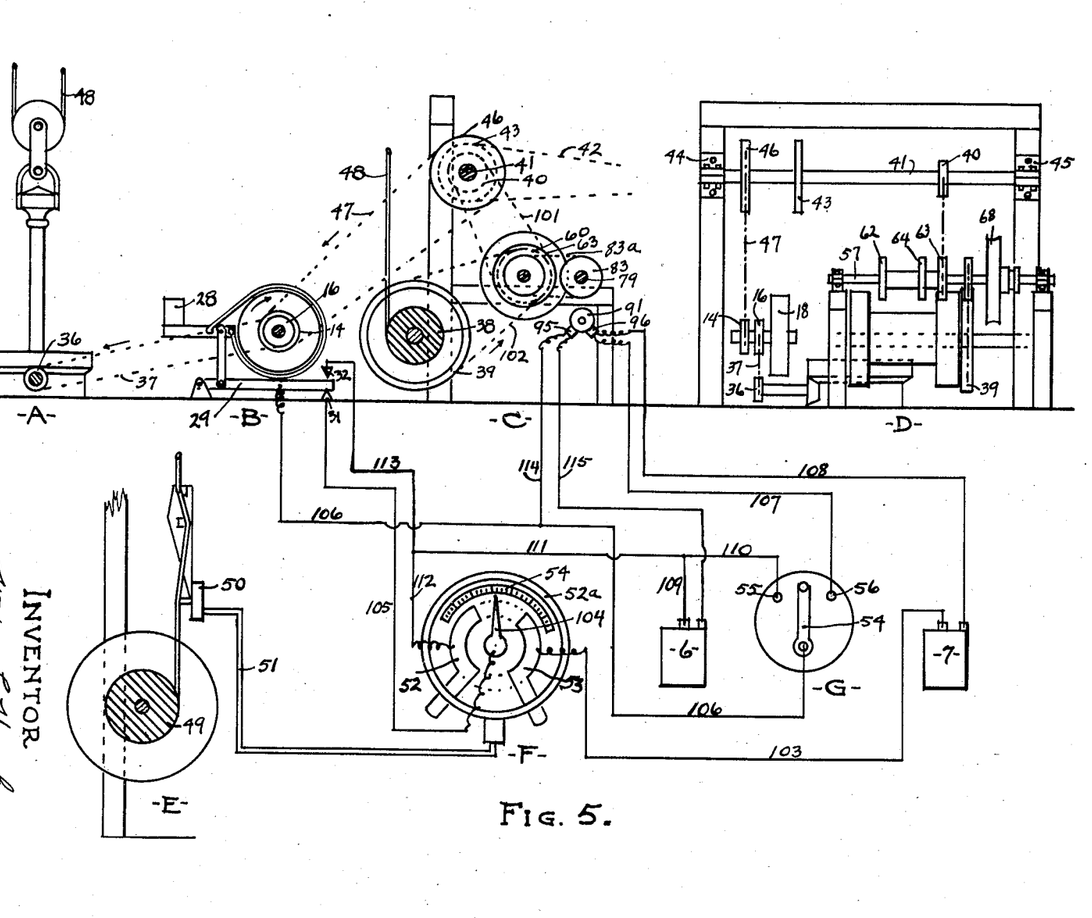
Fig. 5 is a diagrammatic view showing my invention positioned for use in an oil well drilling rig and the plan for electric wiring connected therewith. —A— represents the turn table, —B— the torque control, —C— the side elevation of a draw works, —D— the right elevation of —C—, —E— the calf wheel and drum, —F— the weight indicating control gauge, —G— a manual switch for use of the operator.

Its application to automatic drill control is as follows. Referring to Fig. 5, —A— represents a rotary turn table operated from its sprocket 36 by chain 37 from the sprocket 16 on —B— which is the torque control mechanism heretofore described. —C— represents the hoisting equipment of the ordinary rotary well drilling rig. 38 is the cable drum operated by sprocket 39 at the end thereof. Said sprocket is ordinarily operated by a chain running to sprocket 40 keyed on line shaft 41 which is caused to rotate by power from an outside source such as a motor or engine through chain 42 to sprocket 43 keyed to shaft 41. Line shaft 41 is rotatably mounted in bearings 44 and 45 fastened to the framework. On line shaft 41 is also mounted the sprocket 46 which is usually secured to 41 by means of a clutch. For our purpose we will assume that sprocket 46 is rigidly locked to shaft 41. Sprocket 46 drives sprocket 14 on —B— by means of chain 47. Wound around cable drum 38 is a cable 48 which extends upward to top of derrick, not shown. Passing through the crown block and the traveling block the cable continues down to the calf wheel drum 49 shown at —E— Fig. 5. This part of the cable is termed the dead line.

Suspended from the traveling block is the tool string passing through the rotary table shown at —A—. At the bottom of the tool string is fastened the drill bit. Any weight suspended from the traveling block causes a proportionate stress in the dead line. On the dead line near the cable drum 49 is a weight indicating actuator 50 such as described in our former application Serial No.

417,108 previously mentioned. By means of the deflected line, any stress in the dead line is communicated to a diaphragm in the actuator, thence by means of a fluid in tube 51 to a weight indicating gauge 52a shown at —F—. This is the usual type of pressure indicating gauge. On the dial thereof and insulated therefrom are the electric contacts 52 and 53 adapted to rotate around the needle post by means of lever handles extending through the case. On the dial is also the indicia 54. On the back side of the indicating needle 104 is a brush adapted to contact the contacts 52 and 53 thus making an electric pathway through said gauge. 6 and 7 are sources of electric energy which we have shown as batteries. —G— is a manual switch controlled by operator and consists essentially of a pivoted bar 54 and contacts 55 and 56.

Figure 3:
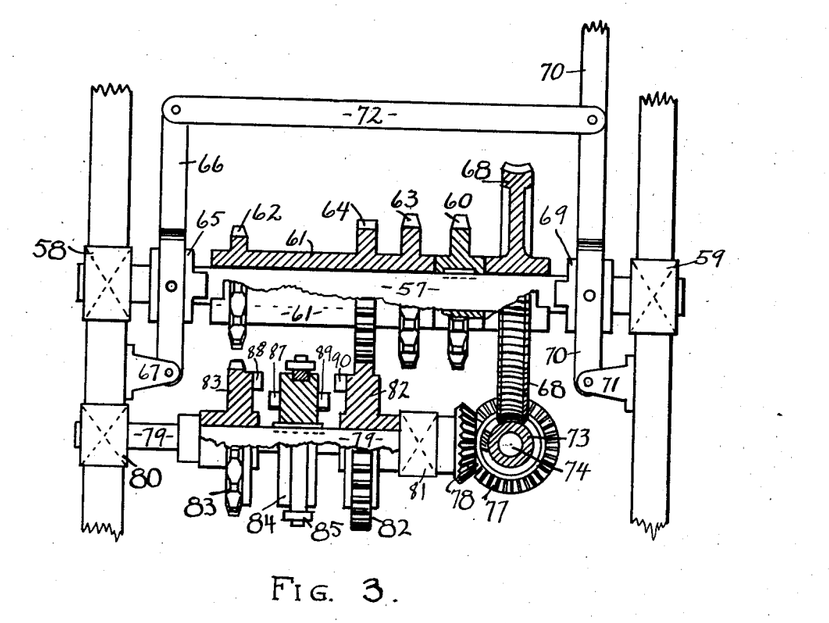
Fig. 3 is a top plan of the feeding mechanism showing part in section along line 3—3 of Fig. 4.
Figure 4:
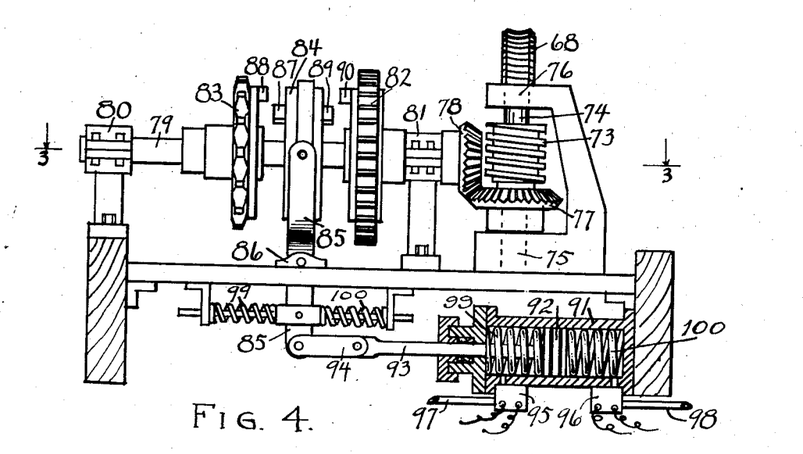
Fig. 4 is a side elevation of Fig. 3.

As shown in —C— Fig. 5, I have intercepted the usual chain connecting sprocket 40 on shaft 41 to sprocket 39 on cable drum shaft, and I have inserted my feeding unit which is shown more in detail in Figs. 3 and 4.

Shaft 57 is mounted for rotation in bearings 58 and 59. Rigidly mounted on shaft 57 is the sprocket 60 and at the left side of this sprocket is the sleeve 61 rotatably mounted on shaft 57. Fixed upon sleeve 61 are the sprockets 62 and 63 and the spur gear 64. Slidable but not rotative, with reference to shaft 57, is mounted on said shaft the clutch 65 which is adapted to engage the end of sleeve 61 and when so engaged, to lock said sleeve to said shaft. Clutch 65 is operated by yoke 66, one end of which is pivoted to framework at bearing 67. Mounted for rotation on shaft 57 next to sprocket 60 is the worm gear 68 with its outer hub adapted to engage the clutch 69 which is slidably but not rotatably mounted on shaft 57 and when engaged with said clutch the worm gear 68 is firmly locked to said shaft. 70 is the operating yoke for clutch 69 and the end is pivoted to framework at bearing 71. The yoke 70 is connected to yoke 66 by link 72 in such manner that it is impossible to engage both clutches, 65 and 69, at the same time. The worm gear 68 is operated by the worm 73 rigidly mounted on shaft 74 which is mounted for rotation in bearings 75 and 76. Rigidly mounted on shaft 74 is the bevel gear 77 and its mate 78 is rigidly mounted at the end of shaft 79 which is mounted for rotation in bearings 80 and 81. Mounted for rotation on shaft 79 is the gear 82, the teeth of which mesh with the teeth of gear 64. Mounted for rotation on shaft 79 and in alignment with sprocket 62 is the sprocket 83 which is connected to sprocket 62 by the chain 83a. When rotating, sprocket 83 and gear 82 travel in opposite directions. Slidable but not rotative, with reference to shaft 79, is mounted the clutch member 84 operated by yoke 85 pivoted to framework at bearing 86. The clutch member 84 may be adapted to engage either sprocket 83 or gear 82 by any form of clutch but for simplicity we have shown a pin or projection 87 fastened on side of 84 and adapted to engage a similar projection 88 fastened on side of 83. In like manner the projection 89 is fastened on side of 84 and adapted to engage a similar projection 90 on side of gear 82. It is provided that clutch member 84 may engage sprocket 83 or gear 82 at will of operator but not both at same time. The clutch 84 is operated by a cylinder 91 mounted on framework. The cylinder 91 contains piston 92 and connecting rod 93 and is adapted to operate by admission into cylinder of fluid under pressure. Rod 93 is connected to end of clutch yoke 85 by means of the link 94. Fluid under pressure enters the cylinder through the common form of solenoid or magnetic valves 95 and 96 through the pipes 97 and 98 connected to an outside source of supply. The solenoid or magnetic valves 95 and 96 are so arranged that when the armature is attracted by the presence of an electric current, the port is opened allowing fluid under pressure to enter cylinder and when armature is retracted, the intake port is closed and an exhaust port opened allowing the used fluid in the cylinder to escape. The spiral springs 99 and 100 are placed in a manner to hold piston 92 in a central or neutral position in cylinder when not in use. Sprocket 63 on shaft 57 is connected to sprocket 40 on line shaft 41 by chain 101, and sprocket 60 on shaft 57 is connected to sprocket 39 on cable drum shaft by chain 102.

Figure 6:
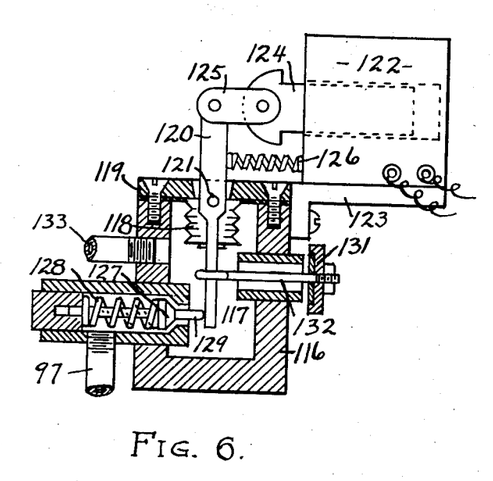
Figure 6 is a cross section through the solenoid valve shown at 95 and 96 in Figure 5.

Referring to Figure 6, the drawings show the solenoid valve (95 or 96) at the half way point of its stroke. A body 116 is hollowed out on one side and this is formed into an air-tight chamber 117 by means of a flexible bellows 118 held in place by a cover plate 119 securely fastened to the body 116. The lever 120 is rockably pivoted to cover 119 by the pin 121. The lower end of lever 120 is extended downward into chamber 117 and pierces the bottom wall of bellows 118 to which it is soldered. An electric solenoid 122 is fastened to said body 116 by the bracket 123. Slidably mounted in one side of the solenoid 122 is an armature 124 which is connected to the top end of lever 120 by the link 125. An electric current flowing through the windings of the solenoid 122 attract the armature 124, moving it to the right. When the current is broken, said armature is moved to the left to its normal position by the spring 126.

In the left wall of body 116 is the intake valve 127 which is normally held against its seat by spring 128. A projection 129 of the valve 127 is prolonged to come into contact with the lower end of lever 120, and when pushed will open said valve 127 and permit fluid, under pressure from a suitable container, to enter chamber 117 through the conduit 97. In the right wall of body 116 is an exhaust valve 131 which is closed by a connecting rod 132 fastened to the lever 120 whereby a movement to the left brings said valve to its seat. The chamber 117 is connected to the cylinder 91 by the passage way 133. In the normal working position the top of lever 120 and the armature 124 is held to the left extremity of their stroke. The bottom end of lever 120 is to the right holding valve 131 open and allowing valve 127 to be closed. The interior of cylinder 91 is now open to the atmosphere through valve 131. When the current flows in the solenoid, the armature is moved to the right and the bottom of lever 120 moves to the left which closes the exhaust valve 131 and opens the valve 127 which allows fluid under pressure to enter cylinder 91.

Figure 7:
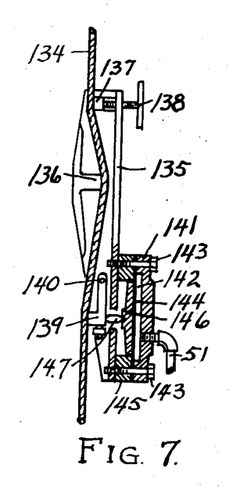
Figure 7 is an elevation showing parts in section of the actuator 50 shown in Figure 5.

In Figure 7, 134 represents the dead line. The arm 135 forms the backbone of the actuator. On one side of said arm, intermediate its ends, is an abutment 136 which pushes against the dead line helping to form the angle of deflection. Near the upper end of said arm 135 is an abutment 137, which is slidable in guideways and held against the dead line by the adjusting screw 138. Near the bottom end of said arm 135 is an abutment 139 hinged to said arm by pin 140. A flat capsule 141 having a depression 142 in one side is secured to arm 135 by bolts 143. 142 is formed into an air-tight chamber by means of a flexible diaphragm 144 held in place by an annular member 145 which is securely fastened to the body part of said capsule 141.

Within the annular member 145 is placed a piston 146 adapted for a free movement toward or away from chamber 142, bending the diaphragm 144 and thereby reducing or increasing the volume of said chamber. The center of said piston 146 is positioned so that the plane of the diaphragm is normal to the line of force from the cable 134 acting through the abutment 139. A spacing member 147 with pointed ends is inserted between abutment 139 and piston 146 and communicates the pressure of said cable against said abutment to said piston and said diaphragm. The pressure against said diaphragm is communicated to a suitable pressure gauge such as show at F in Figure 5 by means of a non-compressible fluid in a connecting conduit 51.

The cable 134 being deflected by abutments 136, 137 and 139 will cause a proportionate part of any tensile stress in said cable to be communicated to said diaphragm and consequently to be indicated on said pressure gauge.

In operation, the weight of the tool string suspended from the traveling block causes a stress in the dead line which is communicated to the diaphragm of the weight indicating actuator 50, thru the tube 51 to the indicating gauge 52a. The needle swings from the left side, which is zero on the scale, to a point on the scale which indicates the weight of the tool string. The point of the contact 53 is moved as many degrees to the left of the needle point as corresponds to the weight desired to place upon the drill bit for operation. The brush under the needle is now in contact with contact 53. The point of contact 52 is placed as many degrees to the left of the needle point as corresponds to the maximum amount of weight it is thought safe to have rest upon the drill bit. 52 does not at any time make contact with 53. The line shaft 41, set in motion, rotates sleeve 61 through chain 101 and sprockets 40 and 63. Sprocket 62 now rotates sprocket 83 by means of chain 83a. Gear 64 rotates gear 82 in the reverse direction to 83. Clutch 69 is engaged to worm gear 68—clutch 65 is free.

The machines being wired as shown on the drawings, the electric circuits are as follows; manual switch —G— is set bar 54 on contact 56. Current from battery 7 flows thru wire 103, contact 53, needle 104, wire 105, contact 31, beam 29, wire 106, switch 54—56, wire 107, solenoid 96 wire 108 back to battery 7. The flow of current thru solenoid 96 causes the armature to be attracted admitting fluid under pressure to the right end of cylinder 91 (Fig. 4) forcing piston 92, rod 93, link 94 and lower end of 85 to the left. The upper end of 85 by virtue of pivot 86 moves to the right sliding clutch 84 on shaft 79 and bringing said clutch in connection with gear 82 which is in motion. 82 therefore rotates 84 which rotates 79 and the worm 73 thru the gears 78 and 77. Worm 73 rotates worm gear 68 which rotates shaft 57 through clutch 69. Sprocket 60 being fast to shaft 57 rotates the cable drum 38 thru chain 102 and sprocket 39, in a direction to unreel or unwind the cable 48 from said cable drum. The drill string lowers until the bit strikes bottom and weight is being transferred from the cable and blocks to the formation under the drill. As the weight leaves the blocks and cable, the hand on the indicating gauge starts to move to the left until contact is broken at point of contact 53 and the electric circuit is interrupted, therefore de-energizing solenoid 96 allowing pressure in cylinder 91 to escape and the spring 99 returns piston to central position of cylinder which breaks connection between clutch 84 and gear 82 thus stopping the feeding mechanism from further unreeling the cable from cable drum.

As the bit digs into the formation more weight is transferred back to the cable and blocks and the indicating needle moves to the right again and makes contact with 53 which re-establishes the electric circuit thru battery 7 and the operations just described are repeated.

At any time during drilling operation should the bit become lodged or the torque required to rotate same be more than the machine —B— be set for then beam 29 is raised, as heretofore explained, against contact 32 thus breaking the feeding circuit at contact 31. We now have current flowing from battery 6 thru wires 109, 111, 113, contact 32, beam 29, wires 106, 114 solenoid 95 wire 115 back to battery 6. Solenoid 95 being energized admits fluid under pressure to left end of cylinder 91, (Fig. 4) forcing piston 92, rod 93, link 94 and lower end of 85 to the right thus causing clutch 84 to move to the left and connects with sprocket 83 thus rotating shaft 79, gears 78—77, worm 73, worm gear 68, clutch 69, shaft 57, sprocket 60, chain 102, sprocket 39, cable drum 38 in a direction to wind up the cable 48 on drum 38 thus raising the tool string from the hole until bit becomes released then beam 29 falls onto contact 31 thus breaking the lifting circuit and re-establishing the feeding circuit. The feeding mechanism now stops lifting and resumes the feeding process until further interrupted.

If the weight upon the drill for any reason becomes too great for the amount gauge 52a is set for then needle 104 moves to the contact 52 and the electric circuit is then, battery 6, wires 109, 111, 112, contact 52, needle 104, wire 105, contact 31, beam 29, wires 106, 114 solenoid 95 wire 115 battery 6. The lifting mechanism now operates as described and the weight of the drill on the structure transfers back to the line and blocks thus causing the needle 104 to move to the right from contact 52 which breaks the lifting circuit and stopping the lifting mechanism.

At any time the operator desires to lift the tool string by means of the automatic device, he operates switch —G— moving bar 54 from contact 56 to 55 thus breaking the feeding circuit and establishing the lifting circuit, current flowing from battery 6 thru wires 109, 110, contact 55, bar 54, wires 106, 114, solenoid 95, wire 115 to battery 6.

When clutch 65 is engaged with 61 (Fig. 3), clutch 69 is released from 68 thus cutting out the feeding mechanism. The transmission of power now comes from line shaft 41, sprocket 40, chain 101, sprocket 63, clutch 65, shaft 57, sprocket 60, chain 102, sprocket 39 giving the operator the same function he had before my device was installed.

Having described my invention what I claim is:

1. In a well drilling apparatus, the combination of a draw works, a cable, a tool string suspended from said cable, a weighing device carried by said cable adapted to indicate the weight of said tool string and means set in motion by said weighing device to cause the tool string to be raised or lowered for maintaining a predetermined portion of the weight of the tool string upon the drill bit, a torque control device adapted to divert from the drill the excess torque or driving force over and above the resistance set for said drill and means set in motion by said torque control device to raise said tool string until resistance to rotation is lessened and normal rotation is resumed by said drill.

2. In a well drilling device, the combination with a draw-works, a cable suspended from said draw-works, and a tool string suspended from said cable, of a weighing device carried by said cable adapted to indicate the weight of said tool string, means set into action by said weighing device to cause the tool string to be raised or lowered to maintain a pre-determined portion of the weight of the tool string upon the drill bit, torque control mechanism interposed in said draw-works which divert from the drill the excess torque over and above a pre-determined amount, and means set into action by said torque control to cause said draw-works to wind said cable until the resistance to rotation applied to said drill is equal to or less than the torque limit for which said torque control is set.

3. In an organization suitable for drilling a well, a cable, a tool string suspended from said cable, a rotary table adapted to rotate said drill string, a draw-works including a drum to wind or unwind said cable thereby raising or lowering said drill string, a prime mover adapted to rotate said rotary table and said draw-works; a weight indicator comprising an actuator carried by said cable and operated by the stress in said cable, a pressure gauge connected to said actuator adapted to indicate the weight of said tool string; an electric switch operated by said pressure gauge and adapted to close an electrical circuit at any desired pressure; a clutch interposed between said prime mover and said cable drum, means operated by said electric switch and circuit to cause said clutch to rotate said cable drum in a direction to unwind said cable from said drum to lower said tool string; a torque limiting device interposed between said prime mover and said rotary table, and comprising a planetary gearing and friction means adapted to relieve the rotary table of the applied torque over a predetermined amount, a second electric switch and circuit controlled by said friction means; a second clutch interposed between said prime mover and said cable drum, means for causing said second clutch to be set into operation by said second electric switch and circuit to cause the said cable drum to be rotated in a direction to wind up the said cable on the said cable drum thereby raising said tool string.

4. In an organization suitable for drilling a well, a cable; a tool string suspended by said cable; a boring tool on the end of said tool string; a rotary table to rotate said tool string; a draw-works including a drum to wind or unwind said cable thereby raising or lowering said tool string; a prime mover to rotate said rotary table and said cable drum; a mechanism inserted in said draw-works and interposed in the line of power transmission between said prime mover and said cable drum; said mechanism comprising a worm and worm gear, a pair of independent clutches arranged to rotate in opposite directions, and adapted when in their operative positions to cause said cable drum to rotate in a direction to wind or unwind said cable therefrom; a weight indicator adapted to indicate the weight of said tool string, comprising an actuator carried by said cable and being adapted to be actuated by a proportionate part of the weight of said tool string; a pressure gauge, a connection between said actuator and said gauge, and a fluid under pressure in said actuator, connection and gauge; means operated by fluid under pressure for causing said clutches to move into or out of their operative positions; electrically operated means responsive to said pressure gauge to control said fluid pressure operated means; a mechanism interposed between the prime mover and the tool string to limit the torque applied to said tool string to a predetermined amount, comprising a rotatable shaft, a housing rotatable about said shaft, a planetary gearing in said housing, means for applying a predetermined amount of friction to said housing to prevent its rotation and means set into action by said friction means to cause one of said clutches to cause said cable drum to wind said cable thereon.

5. In a device of the character described; a contrivance to automatically control a draw-works to permit only a predetermined portion of the weight of the tool string to rest on the earth's structure and to limit the torque applied to the tool string to a predetermined amount, said contrivance comprising a mechanism adapted to be attached to a draw-works and interposed in the line of power transmission between a prime mover and the cable drum of said draw works for controlling the rotation of said drum, said mechanism including a shaft rotatable in bearings and having a pair of clutches mounted thereon arranged to be rotated in opposite directions and when in their operative positions to cause said shaft to rotate in unison therewith; a worm and worm gear mounted for rotation and adapted to be rotated by said shaft; a connection between said worm gear and said drum whereby the rotation of said worm gear will rotate said drum; a weight indicator actuated by and adapted to indicate the weight of said tool string; means controlled by said indicating means to cause said clutches to move into or out of their operative positions; a torque control mechanism attachable to said draw-works and interposed in the line of power transmission between the prime mover and the rotating means for said tool string whereby the torque applied to said tool string may be limited to a predetermined amount, said torque control mechanism comprising, a main shaft rotatably mounted, an operative connection between said shaft and the prime mover, a quill shaft rotatable about said main shaft, a housing rotatable about said main shaft and said quill shaft, a sun gear rigidly secured to said main shaft, a sun gear having a different diameter from said first sun gear and being securely mounted on said quill shaft, a connection between said quill shaft and said rotating means for said tool string whereby the rotation of said quill shaft will cause said tool string to rotate; a planet gear rotatably mounted in said housing in operative engagement with both of said sun gears, whereby the rotation of said main shaft will cause said planet gear and said quill shaft to be rotated; an adjustable friction means applied to said housing adapted to prevent its rotation until the torque reaches a predetermined point and means set into operation by said friction means for causing one of said clutches to operatively engage said first shaft and cause said drum to wind said cable and raise said tool string until the resistance to rotation of said tool string is equal to or less than the limit set for the applied torque.

6. In well drilling equipment having a boring tool and hoisting means to raise or lower the same, and means to rotate said boring tool and operate said hoisting means, mechanism operable by the weight of said boring tool which indicates the weight of said boring tool and includes means set into action by said weight indicator to cause said hoisting means to automatically raise or lower said boring tool as needed to maintain a predetermined pressure of the boring tool against the earth's structure, mechanism including gearing and friction members, operable by said rotating means which automatically relieve the boring tool from rotating force in excess of a predetermined amount and means that may be set into action by the last named mechanism to cause said hoisting means to raise said tool from the structure operated upon.

7. In a hole drilling machine having a boring tool and a prime mover to rotate same, the combination of a device operable by the weight of said boring tool to indicate the weight of said tool, feeding and retrieving mechanism, including gearing and clutches, operatively connected to said prime mover and said boring tool which is adapted to be controlled by said weight indicating device to cause said boring tool to be automatically fed to or retrieved from the structure to be operated upon as needed to maintain a predetermined pressure of the boring tool upon the said structure, and torque controlling mechanism including gearing and friction means which are operatively connected in the line of power transmission between said boring tool and said prime mover to cause the rotating force over and above a predetermined amount to be diverted from said boring tool, and means operable by said torque controlling mechanism to cause said retrieving means to retrieve said boring tool from said structure whenever the torque applied to said torque controlling mechanism is greater than the amount for which said torque control is set.

8. In a well drilling organization, the combination of a draw works, a cable suspended from said draw works, a tool string suspended from said cable, a prime mover to operate said draw works; means to rotate said tool string; a weighing device carried by said cable, actuated by and adapted to indicate the weight of said tool string, means set into action by said weighing device to cause said draw works to feed or retract said tool string as needed to maintain a predetermined portion of the weight of said tool string on the earth's structure, torque control mechanism inserted in the line of power transmission required to rotate said tool string and adapted to divert from the drill the excess torque over and above a predetermined amount, means operable by said torque control mechanism which, when the torque applied to said drill exceeds said predetermined amount, causes the feeding operation to be discontinued and causes said draw works to retract said tool string until the applied torque to said tool string shall fall below said predetermined amount, whereupon rotation of said tool string is resumed and the feeding operations re-established.

9. In well drilling equipment having a tool string, hoisting means to feed and retrieve said tool string, and a source of power to operate said hoisting means and rotate said tool string; the combination of a weighing device operable by a percentage of the weight of said tool string, means set into action by said weighing device to cause said hoisting means to automatically feed said tool string to the structure operated upon when the pressure of the tool bit against said structure is less than a predetermined amount, means set into action by said weighing device to automatically cause said hoisting means to retrieve said tool string when the pressure of said tool bit on said structure is greater than said predetermined amount, and torque control device, including gearing and friction members, inserted in the line of power transmission required to rotate said tool string, which prevents more than a predetermined amount of rotating force to be applied to said tool string, and means set into action by said torque control device which interrupts said feeding operation and causes said hoisting means to retrieve said tool string when the rotating force applied to said torque control device exceeds the said predetermined amount to be applied to said tool string.

10. In a well drilling organization having a tool string with a drill bit on the end thereof, hoisting means to feed or retrieve said tool string, rotating means for said tool string and a prime mover to operate said hoisting means and said rotating means; the combination of a control unit containing a frame work, gearing and clutches operatively mounted and connected to said hoisting means and said prime mover whereby operation of said unit will cause said prime mover to operate said hoisting means, a weight indicating device operable by the weight of said tool string, means operable by said weight indicating device to control the operation of said control unit, and a torque limiting unit containing a frame work, gearing and friction means operatively mounted and connected in the line of power transmission between the prime mover and said rotating means whereby the torque applied to said tool string may be limited to a predetermined amount and means operable by said torque limiting unit to cause said control unit to cause said hoisting means to retrieve said tool string when the resistance to rotation applied to the tool string is greater than the torque limit for which said torque control unit is set.

11. In a well drilling outfit having a tool string with a boring tool on the end thereof, hoisting means to raise or lower said tool string and a prime mover to operate said hoisting means and rotate said tool string, in combination, an attachment to said hoisting means, said attachment containing rotatable shafting, gears and clutches in operative engagement with said hoisting means and said prime mover whereby the operation of said hoisting means by said prime mover may be made through the gearing in said attachment and be controlled thereby, means actuated by the weight of said tool string and operatively connected to the mechanism in said attachment whereby last said mechanism may be controlled by said weight actuated means to cause said hoisting means to raise or lower said tool string as needed to maintain a predetermined portion of the weight of said tool string on the earth's structure, and a second attachment containing gearing and friction means which are operatively connected to said prime mover and said tool string whereby the rotating force applied to said tool string may be limited to a predetermined amount and means operable by the mechanism in second attachment to cause the mechanism in the first mentioned attachment to cause said hoisting means to raise said tool string when the resistance to rotation applied to said tool string is greater than the rotating force for which said second attachment has been set.

12. In apparatus suitable for drilling a well having a tool string suspended from a cable, hoisting means to raise or lower said tool string and a prime mover to operate said hoisting means and rotate said tool string, a device to indicate the weight of said tool string in combination with means to automatically control the operation of said hoisting means and means to limit the torque applied to said tool string to a predetermined amount; said weight indicating means consisting substantially of an arm on which is fixed a fluid tight reservoir having a collapsible side, a piston adapted to bear against said collapsible side and one side of said cable, two brackets attached to said arm and adapted to deflect said cable out of a straight line thereby causing a portion of the stress in said cable to press against said piston, a pressure gauge, a conduit connecting said pressure gauge with said reservoir, a liquid in said gauge, conduit and reservoir; said control means for said hoisting means consisting substantially of mechanism including rotatable shafting, gears and clutches, inserted in the line of power transmission between said prime mover and said hoisting means whereby the raising and lowering of said tool string by said hoisting means is automatically controlled by said control means; means operatively connected between said pressure gauge and said control means whereby the action of said control means may be governed by the weight of said tool string; said torque limiting means consisting substantially of mechanism, including gearing and friction members interposed in the line of power transmission between said prime mover and said tool string whereby the torque applied to said tool string is limited to a predetermined amount and means operable by said torque limiting means to cause said control means to cause said hoisting means to raise said tool string when the resistance to rotation applied to said tool string exceeds the torque limit for which said torque limiting means has been set.

13. In well drilling apparatus in combination, a tool string, a prime mover to operate said tool string, a weight indicator to indicate the weight of said tool string, means operable by said weight indicator to automatically control the weight of the tool string applied to the earth structure, fluid operated means being a part of said control means and including electrically operated valves, a device to limit the torque applied to said tool string to a set amount, an electric circuit consisting substantially of a switch operated by said weight indicator, a switch operated by said torque limiting device, a manually operated switch, and a magnetic valve, connected in series by a conductor to a source of electric current; a second electric circuit consisting substantially of a switch operated by said weight indicator, a switch operated by said torque limiting device and a manually controlled switch connected in parallel relation and these three last named switches connected in series by suitable conductors to a magnetic valve and a source of electric current.

14. An apparatus for controlling the feed of rotary well drilling rigs, comprising a supporting line adapted to carry a drill pipe, hoisting means adapted to take up and let out said line, a prime mover for operating said hoisting means and to rotate said drill pipe, a tension measuring device which deflects a part of said line out of its normal position and which includes a capsule one side of which is closed by a flexible diaphragm, a piston adapted to flex said diaphragm and to bear against one side of said line, a frame work to support said capsule, two supports on said frame at a distance from said piston to bear against said line and deflect same, a pressure gauge connected to said capsule, a liquid in said capsule and said gauge, a pressure and feed controlling mechanism responsive to said tension measuring device and which controls the operation of said hoisting means, and a torque limiting device, containing gearing and friction means which are operatively connected in the line of power transmission between said prime mover and said drill pipe to limit the rotating force applied to said drill pipe to a predetermined amount and means operable by said torque limiting device to cause the said pressure and feed controlling mechanism to cause said hoisting means to take up said drill line when the resistance to rotation applied to said drill pipe exceeds the limit of rotating force for which said torque limiting device has been set.

15. An apparatus to control the pressure and feed of rotary well drilling rigs, comprising a supporting line adapted to carry a drill pipe, hoisting means adapted to take up and let out said line, rotating means to rotate said drill pipe, a prime mover to operate said hoisting means and said rotating means, a weight measuring device carried by said line and adapted to be operated by the weight of said drill pipe, a pressure and feed controlling mechanism responsive to said weight measuring device and which controls the operation of said hoisting means, and a torque limiting device inserted in the line of power transmission between said prime mover and said drill pipe rotating means, and which comprises a rotatable shaft, a housing adapted to rotate around said shaft, differential gears mounted for rotation in said housing which, when in operation, will cause a tendency to rotate said housing, adjustable friction means to yieldably hold said housing from rotating, and means set into operation by said friction means to cause said feed controlling means to cause said hoisting means to take up said line when said friction means fails to prevent said housing from rotating.

In witness that I claim the foregoing I have hereunto subscribed my name this 22nd day of November, 1930.

WATSON L. HAWK.